US006538746B1

(12) United States Patent
Handrich

(10) Patent No.: US 6,538,746 B1
(45) Date of Patent: Mar. 25, 2003

(54) METHOD AND DEVICE FOR MEASURING ABSOLUTE INTERFEROMETRIC LENGTH

(75) Inventor: Eberhard Handrich, Kirchzarten (DE)

(73) Assignee: Litef GmbH (DE)

( * ) Notice: Subject to any disclaimer, the term of this patent is extended or adjusted under 35 U.S.C. 154(b) by 0 days.

(21) Appl. No.: 09/647,025

(22) PCT Filed: Mar. 19, 1999

(86) PCT No.: PCT/EP99/01865

§ 371 (c)(1),
(2), (4) Date: Nov. 17, 2000

(87) PCT Pub. No.: WO99/50615

PCT Pub. Date: Oct. 7, 1999

(30) Foreign Application Priority Data

Mar. 27, 1998 (DE) .......................................... 198 13 761

(51) Int. Cl.$^7$ ................................................. G01B 9/02
(52) U.S. Cl. ........................ 356/482; 356/486; 356/517
(58) Field of Search ................ 356/477, 482, 356/484, 486, 464, 489, 517; 250/227.19, 227.27; 385/12

(56) References Cited

U.S. PATENT DOCUMENTS

| 4,863,272 A | * | 9/1989 | Coccoli | 356/461 |
| 5,396,328 A | * | 3/1995 | Jestel et al. | 356/460 |
| 5,767,968 A | * | 6/1998 | Strandjord | 356/459 |
| 6,046,810 A | * | 4/2000 | Sanders et al. | 356/459 |

FOREIGN PATENT DOCUMENTS

| DE | 4035373 | 5/1992 |
| DE | 4305458 | 8/1994 |
| DE | 4314486 | 11/1994 |
| GB | 2276449 | 9/1994 |
| WO | 9112487 | 8/1991 |

OTHER PUBLICATIONS

Article: T. Pfeifer and J. Thiel, "Absolute Interferometry with Tunable Semiconductof Lasers," Technisches Messen, vol. 60, nr. 5 (1993), pp. 185 through 191.

* cited by examiner

Primary Examiner—Samuel A. Turner
Assistant Examiner—Michael A. Lyons
(74) Attorney, Agent, or Firm—Elliott N. Kramsky

(57) ABSTRACT

A single laser is stabilized sequentially in time with respect to different wavelengths in conjunction with a continuous, preferably linear, wavelength transition for absolute optical interferometric measurement. During the wavelength transition, the number of the traversing interferences is counted in a measuring channel. The length of a measuring section may be measured in absolute terms to give known and stable wavelengths and phase measurements of the two wavelengths. Active integrated optics and residual phase measurement by compensation in the integrated optics make it possible to detect wavelength differences of $10^{-7}$ λ.

6 Claims, 2 Drawing Sheets

METHOD AND DEVICE FOR MEASURING ABSOLUTE INTERFEROMETRIC LENGTH

BACKGROUND

1. Field of the Invention

The present invention relates to optical interferometric length measurement. More particularly, this invention pertains to a method and device in which a high coherence length beam or beam component stabilized with respect to a reference section is split and then recombined after the components traverse reference and measuring sections, the interference pattern is detected, the resulting signal amplified and the measuring signal generated in accordance with a predetermined modulation pattern.

2. Description of the Prior Art

Prior art optical interferometric length measuring systems employ a stabilized, coherent laser light source whose output is split into two components, a reference beam and a measuring beam. The reference beam is retroreflected after traversing a fixed section while the measuring beam is reflected at the measuring object. Two retroreflected partial beams are recombined and directed to an interference with the period $\lambda/2$ where $\lambda$ is the wavelength of the laser light. By measuring the interference phase with an accuracy of $10^{-4}$, it is possible to achieve resolution in the sub-nanometer range. However, the measuring signal obtained is ambiguous, as it repeats itself with a period of $\lambda/2$. A disadvantage for length measurement is the necessity to start with an accurate zero mark (in regard to spatial position) whose periods must be counted and stored. This measuring principle is known as incremental length measurement.

FIG. 4 illustrates the principle of prior art three-beam interferometry in which three (partial) beams are employed to obtain a signal for laser stabilization from the reference section between a first reflector and a second reflector, and the measuring signal from a measuring reflector.

A prior art arrangement (see DE 43 14 486 C2) for three-beam interferometry for absolute length measurement is illustrated in FIG. 3. The illustrated absolute measurement interferometer arrangement 1 has two tunable lasers 2, 3. The laser 2 is modulated by means of an operating current supply (not shown) in a wavelength region of its characteristic free from mode jumps whereas the laser 3 is operated at a fixed wavelength. A measuring interferometer 4 is provided in which an interferometer arm 5 forms the actual measuring section. The generation of at least two mutually interfering component beams 6, 7 is accomplished by photodetectors 11 and 12. The photodetectors 11 and 12 are connected to counting electronics (not shown) while the lasers 2 and 3 are connected to a laser wavelength control device (again not shown). A control interferometer 13 whose control section 14 is of constant length (shorter than half the length of the measuring section) is provided in the immediate vicinity of the measuring interferometer 4. Otherwise, the control interferometer 13 corresponds to the measuring interferometer 4.

The beam of the same laser 2, 3 is applied to the measuring interferometer 4 and to the control interferometer 13 by means of a primary beam splitter 15 and a reflector 16. Coupling of the beam of the laser 2 is performed via a reflector 17. The determination of the absolute distance—$L_{abs}$ can be performed, for example, by using the measured residual phases $\phi_1$ and $\phi_2$ in an interval about the distance determined by the method of continuous tunability to determine the distance for which the following equation:

$$L_{abs}=(n_1+\phi_1)(\lambda_1/2)=(n_2+\phi_2)(\lambda_2/2)$$

is most effectively satisfied with the interval being greater than twice the expected measuring uncertainty and less than half the synthetic wavelength. In the case of continuous transition from one wavelength to the other, the interferences $\Delta n$ traversed are counted:

$$\Delta n=n_2-n_1.$$

It follows from the above that:

$$n_1=(\Delta n+\phi_2-\phi_1)(\lambda_1/(\lambda_1-\lambda_2))$$

Thus, given known and stable wavelengths $\lambda_1$ and $\lambda_2$, $n_1$ can be determined by measuring $\Delta n$, $\phi_1$ and $\phi_2$. Consequently, the length L of the measuring section can be measured in absolute terms or calculated in accordance with the above formula.

According to this prior art method, it is necessary to measure the ordinal number difference $\Delta n$ of the interference as well as the two residual phases $\phi_1$ and $\phi_2$. Absolute accuracy is therefore a function of the accuracy of the residual phase measurements, $\phi_1$ and $\phi_2$. In the prior art, residual phase measurement is accomplished by measuring the intensity of the interference signal for the controlled wavelengths $\lambda_1$ and $\lambda_2$. Absolute length measurement is thereby limited to an accuracy of $\lambda/100$ (compare DE 43 14 486 C2, column 8). Moreover, measuring accuracy is a function of the constancy of the light intensity, which increases the outlay.

SUMMARY AND OBJECTS OF THE INVENTION

It is therefore an object of the invention to provide apparatus and a method for absolute interferometric length measurement with substantially enhanced resolution and accuracy.

Another object of this invention is to achieve the above object at as little additional expense as possible.

The present invention addresses the preceding and other objects by providing, in a first aspect, an improvement in a method for optical interferometric length measurement in which a beam, or beam component, of a laser of high coherence length that is stabilized with respect to a reference section is split into two partial beams. One of the partial beams is reunited after traversing a reference section while the other is reunited after traversing a measuring section. The interference pattern is detected by a detector and the resulting signal is amplified and a measuring signal is generated in accordance with a prescribed modulation pattern. The laser is sequentially stabilized in time with respect to at least two different wavelengths $\phi_1$ and $\phi_2$ for absolute measurement of the length L of a measuring section, the number $\Delta n$ of the interferences traversing the detector counted during transition from a first to a second wavelength, and the absolute length L then being calculated as a function of phase measurements $\phi_1$, $\phi_2$ for the two stabilized wavelengths $\lambda_1$, $\lambda_2$.

The improvement comprises the step of performing the phase measurement in a resetting control loop that compensates the phases.

In a second aspect, the invention provides a device for absolute optical interferometric length measurement. Such device includes a four-beam interferometer in which a light beam emanating from a laser is split in a 2×2 coupler into two partial beams onto a reference channel and a measuring channel separate therefrom.

The two partial beams are each split in an integrated optical chip into two further partial beams that traverse a phase modulator that is integrated in the chip.

A processor is provided for applying different frequencies for the reference and measuring channels. A closed control loop is provided for measuring the phases of the reference and measuring channels by compensation at the phase modulators. A control circuit is provided for controlling the laser wavelengths ($\lambda_1$, $\lambda_2$) and the output of such processor is applied to the control circuit.

The preceding and other features of this invention will become further apparent from the detailed description that follows. Such description is accompanied by a set of drawing figures. Numerals of the drawing figures, corresponding to those of the written description, point to the features of the invention with like numerals referring to like features throughout.

BRIEF DESCRIPTION OF THE-DRAWINGS

DETAILED DESCRIPTION OF THE PREFERRED EMBODIMENT

Figure 1:
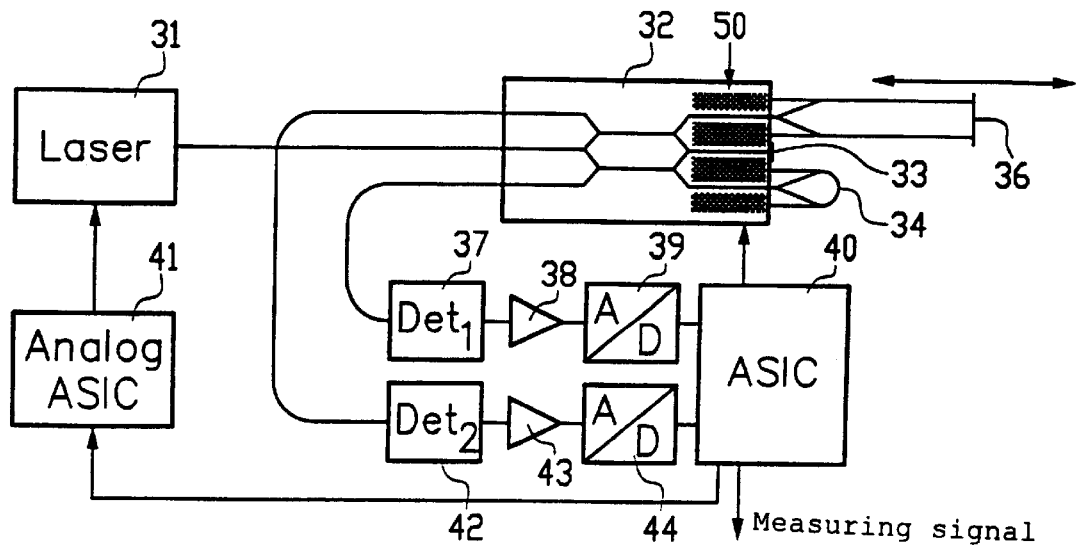
FIG. 1 is a block schematic diagram of a multi-beam interferometer in accordance with the invention.

An implementation of a method for optical interferometric absolute length measurement in accordance with the invention is explained below and illustrated by FIG. 1.

The output beam of a laser 31 of high coherence length is guided by a fiber section to an integrated optics (IO) chip 32 where it is split into three partial beams whose phases can be modulated by means of electrodes 50 integrated in an IO chip 32 to generate a suitable signal. In such case, "high coherence length" refers to lengths up to one meter and, if appropriate, to 100 meters. The lower beam is reflected after traversing a reference section 34 (preferably of cerodur or steel due to their well-known low expansion coefficients). The middle beam is reflected directly at the IO chip 32 by a reflective layer 33.

The reflected lower and middle beams interfere with one another and are sensed at a detector 37, then amplified at 38 and digitized in an A/D converter 39. The interference signal is evaluated in a processor 40 (generally implemented as an ASIC) to stabilize the wavelength of the laser 31 with respect to the reference section 34 by means of an analog processor 41 (also preferably implemented as an ASIC).

The phase of the lower or middle partial beam is modulated by the ASIC 40 by the phase modulator 50 in a known way, producing a modulated light intensity at the detector 37. The signal is further processed in the ASIC 40 to compensate the phase at the phase modulator 50.

The upper partial beam (measuring beam) is focused in parallel by a graded-index lens 35 and reflected at a measuring reflector 36 (at the object to be measured) to then interfere with the middle partial beam. The resulting interference pattern is detected by a second detector 42, amplified by an amplifier 43 and digitized in a second A/D converter 44. Corresponding modulation patterns are generated in the ASIC 40 by the phase modulator 50.

Upon detecting the modulated light intensity at the second detector 42, a control signal is activated in the ASIC 40, and the resulting phase is compensated by the phase modulator 50. The required wavelength changes from $\lambda_1$ to $\lambda_2$ are controlled by the ASIC 40 via the analog ASIC 41 and the laser 31.

The phase measurements for $\lambda_1$ and $\lambda_2$ are thus performed by a servo loop method for fiber optic gyros described, for example, in U.S. Pat. No. 5,123,741 and in European patent application 055 537, the teachings of each of which is hereby incorporated by reference. With the aid of such servo loop method, it is possible to achieve a phase resolution of $10^{-7}$ $\lambda$ that is independent of light intensity and distinguished by a broad measuring bandwidth.

Figure 2:
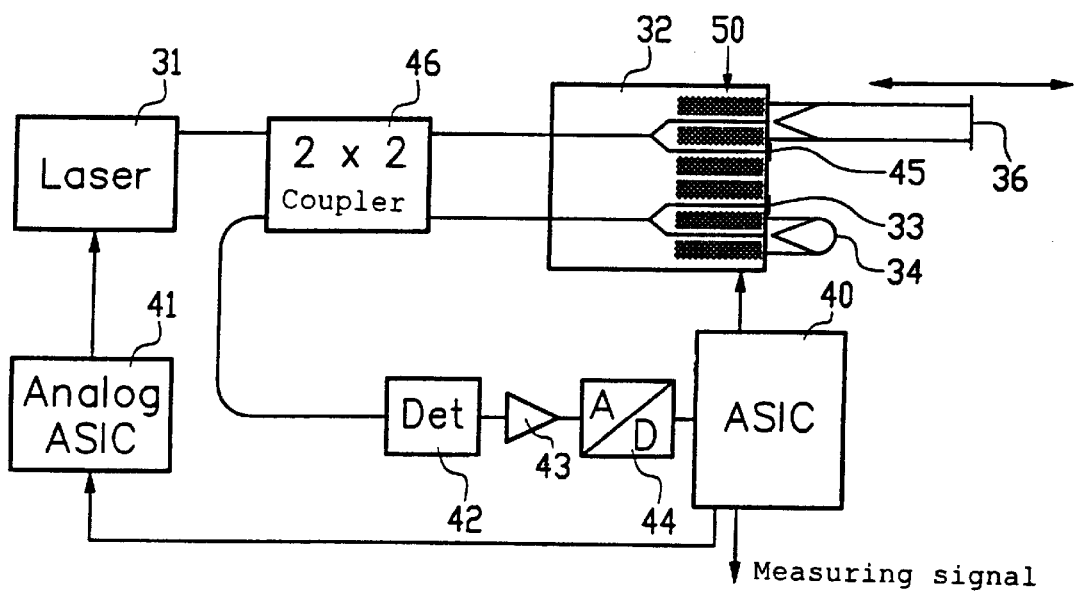
FIG. 2 is a block diagram of a four-beam interferometer in accordance with an alternative embodiment of the invention in which a particularly effective separation is implemented between a measuring channel and a reference channel.
Figure 3:
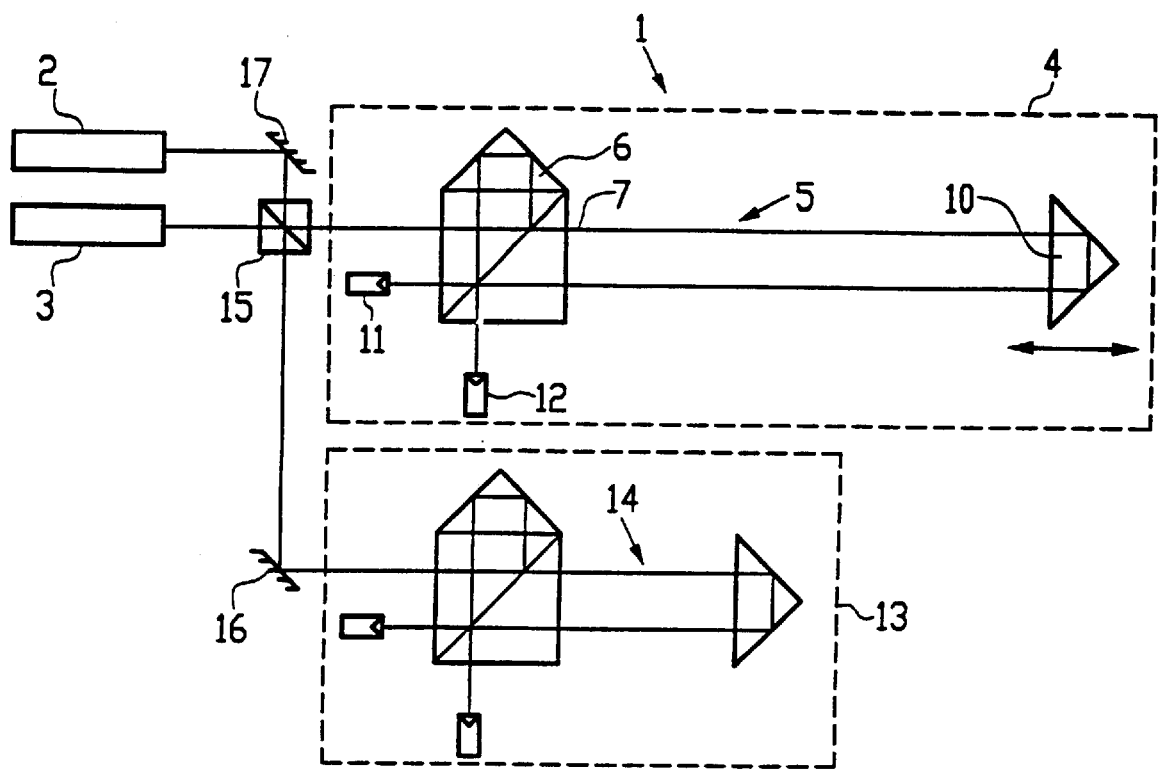
FIG. 3 is a block diagram of an arrangement for three-beam interferometry for absolute length measurement in accordance with the prior art.
Figure 4:
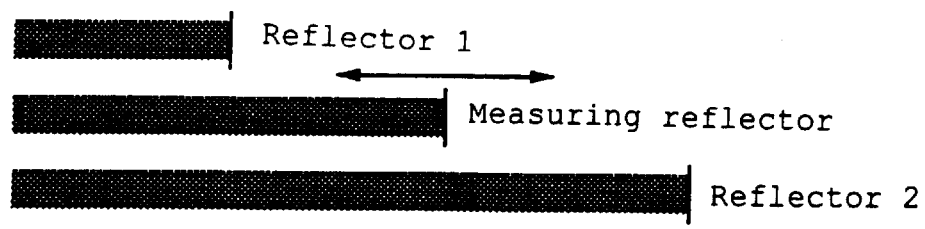
FIG. 4 illustrates incremental three-beam interferometry in accordance with the prior art.

FIG. 2 illustrates an alternative embodiment of the invention characterized by a particularly low outlay, and implemented as a four-beam interferometer with clear separation between the measuring and reference channels. The two interferometer sections are driven by a 2×2 coupler 46.

In the block diagram illustration of FIG. 2, components or modules already discussed with reference to FIG. 1 and explained above are assigned like reference symbols, it being known to those skilled in the art that stabilization of the laser 31 with respect, for example, to two wavelengths $\lambda_1$ and $\lambda_2$ necessitates appropriate hardware and software changes in the ASIC 40 and/or the analog ASIC 41 that drives the laser 31. By contrast to the design of FIG. 1, it is seen that only a single detector 42 is employed whose output signal is amplified in the amplifier 43 and undergoes an analog-to-digital conversion at 44. The electronic system is equipped with only a single channel rather than the two channels of FIG. 1. Present in addition, by contrast is the already-mentioned 2×2 coupler 46, through which the light beam from the laser 31 is first split into two measuring beams or channels (i.e., an upper measuring channel and a lower reference channel). This produces a clearly simpler structure for the IO chip 32, as may be seen from direct comparison of the arrangement according to FIG. 2 with that of FIG. 1.

The reference channel with reference section 34 is of the same design (in principle) as that of FIG. 1. A similar situation pertains to the (upper) measuring channel, differing in that the reflective layer 33 on the IO chip 32 is only associated with the reference channel while a further reflective layer 45 is associated with the measuring channel on the IO chip 32. The reflected beams of the reference and measuring channels interfere at the 2×2 coupler 46 and the resulting interference pattern is sensed at the detector 42. The measuring and reference signals for wavelength stabilization can, in turn, be distinguished by different modulations. Due to such separation, the ASIC 40 can apply different frequencies to the modulations of the measuring and reference channels by the actions of the phase modulators 50 on the four channels. As a consequence, the signals can be detected at a single detector 42 and later separated. Just as in FIG. 1, the phases of the measuring and reference channels are measured by compensation at the phase modulators 50, and the wavelengths $\lambda_1$ and $\lambda_2$ are controlled via the analog ASIC 41.

By comparison with known methods and arrangements for interferometric length measurement, the invention achieves clearly improved separation between a measuring channel and a reference channel. This occurs, even in the case of a single laser that is to be stabilized with respect to a plurality of frequencies, with an integrated optical chip of clearly simpler layout. Thus, improved measurement resolution and accuracy of are achieved through the use of the closed control loop.

The idea of the invention, which aims to increase the resolution and accuracy in absolute interferometric length measurement, is achieved, in particular, by consistent use of active integrated optics and measurement of the residual phases of wavelength values $\phi_1$ and $\phi_2$, by compensating the phase in the integrated optics with a closed control loop.

The basis of the invention relies upon knowledge and experience, obtained in the field of fiber optic gyros, that it is possible to employ such phase compensation methods to determine wavelength differences of $10^{-7}$ $\lambda$. Thus, resolution is raised substantially in comparison to known methods, even for absolute length measurement.

While the invention has been described with reference to its presently-preferred embodiment, it is not limited thereto. Rather, this invention is limited only insofar as it is defined by the following set of patent claims and includes within its scope all equivalents thereof.

What is claimed is:

1. In a method for optical interferometric length measurement in which a beam, or a beam component, of a laser of high coherence length, stabilized with respect to a reference section, is split into two partial beams, one of which is reunited after traversing a reference section and the other reunited after traversing a measuring section, the interference pattern is detected by a detector and the signal formed therefrom amplified and a measuring signal is generated in accordance with a prescribed modulation pattern, the laser being sequentially stabilized in time with respect to at least two different wavelengths $\lambda_1[\phi 1]$ and $\lambda_2[\phi 2]$ for absolute measurement of the length L of a measuring section, the number of $\Delta n$ of the interferences traversing the detector counted during a transition from a first to a second wavelength, and the absolute length L of the measuring section then calculated as a function of phase measurements $\phi_1$, $\phi_2$ for the two stabilized wavelengths $\lambda_1$, $\lambda_2$, the improvement comprising the step of performing the phase measurement in a resetting control loop which compensates said phases.

2. A method is defined in claim 1 wherein said absolute length L is calculated as $$L=((\Delta n+\phi_1/2\pi-\phi_2/2\pi)(\lambda_1/(\lambda_1-\lambda_2))+\phi_1/2\pi)(\lambda_1/2)$$

wherein $\Delta n$ is the measured number of the traversing interferences upon the transition from the first to the second stabilized wavelength, $\lambda_1$, $\lambda_2$ respectively denote the first and second stabilized wavelengths, and $\phi_1$, $\phi_2$ denote the phases measured in the cases of the first and second wavelengths $\lambda_1$ and $\lambda_2$, respectively.

3. A method as defined in claim 1 or 2 wherein said laser wavelengths $\lambda_1$, $\lambda_2$ are stabilized with respect to the respectively equal reference length $I_{Ref}$ in accordance with $$I_{Ref}=k \cdot \lambda_1$$

$$I_{Ref}=(k+1)\lambda_2$$

where k is a whole number.

4. A method as defined in claim 1 wherein said linear transition from the stabilization of the laser with respect to the first wavelength $\lambda_1$ to the second stabilization point of the laser with respect to the second wavelength $\lambda_2$ is performed by a temporal linear increase in the laser current.

5. A method as defined in claim 1 wherein said linear transition from the stabilization of the laser with respect to the first wavelength $\lambda_1$ up to the stabilization of the laser with respect to the second wavelength $\lambda_2$ is performed by the steps of:

a) stabilizing the laser with respect to the reference length in accordance with the relationship $I_{Ref}=k \cdot \lambda_1$; and then b) varying the reference length by means of a linear sawtooth voltage V that influences the reference section ($I_{Ref}$ (V)) wherein a return of the sawtooth voltage (V=0) occurs when a new stabilization $I_{Ref}$ (V)=(k+1) $\lambda_2$ is achieved.

6. A device for absolute optical interferometric length measurement comprising in combination:

a) a four-beam interferometer having a 2×2 coupler for splitting light emanating from a laser into two partial beams onto a reference channel and a measuring channel separate therefrom;

b) said two partial beams each being split into two further partial beams in an integrated optical chip subsequently applied, in each case, to a phase modulator;

c) said phase modulator being integrated in said chip;

d) a processor for applying different frequencies for said reference and measuring channels;

e) said processor including a closed control loop for measuring the phases of said measuring and reference channels by compensation at said phase modulators;

f) a control circuit for controlling said laser wavelengths; and g) the output of said processor being applied to said control circuit.

* * * * *